United States Patent [19]

Ito et al.

[11] Patent Number: 4,712,082
[45] Date of Patent: Dec. 8, 1987

[54] PRESSURE SENSOR

[75] Inventors: Novuei Ito; Minoru Nishida, both of Okazaki; Naohito Mizuno, Nishio; Tadashi Hattori, Okazaki, all of Japan

[73] Assignee: Nippon Soken, Inc., Nishio, Japan

[21] Appl. No.: 842,175

[22] Filed: Mar. 21, 1986

[30] Foreign Application Priority Data

Mar. 25, 1985 [JP] Japan .................................. 60-58499

[51] Int. Cl.[4] .......................... G01L 1/22; H01L 10/10
[52] U.S. Cl. ............................................. 338/4; 338/42
[58] Field of Search .................... 338/3, 4, 2, 5, 42; 73/721, 720, 756, 35

[56] References Cited

U.S. PATENT DOCUMENTS

| | | | |
|---|---|---|---|
| 2,784,593 | 3/1957 | Peucker | 73/720 |
| 3,341,796 | 9/1967 | Eisele | 338/5 |
| 4,382,377 | 5/1983 | Kleinschmidt et al. | 73/35 |
| 4,481,497 | 11/1984 | Kurtz et al. | 338/3 |

FOREIGN PATENT DOCUMENTS 56-43489 10/1981 Japan .
58-5372 1/1983 Japan .

*Primary Examiner*—E. A. Goldberg
*Assistant Examiner*—M. M. Lateef
*Attorney, Agent, or Firm*—Cushman, Darby & Cushman

[57] ABSTRACT

A pressure sensor includes a metal diaphragm provided at the end of a pressure introduction portion, a glass layer bonded to a surface of the metal diaphragm opposite to the pressure introduction side thereof, and a semiconductor chip acting as a semiconductor strain gauge bonded to the surface of the glass layer.

3 Claims, 6 Drawing Figures

PRESSURE SENSOR

BACKGROUND OF THE INVENTION

1. Field of the Invention

The present invention relates to a pressure sensor, and more particularly, to a pressure sensor for sensing a comparatively high pressure, e.g., 50 kg/mm$^2$ or more, of a hydraulic pressure or combustion pressure of an internal combustion engine.

2. Description of the Related Art

In the prior art, pressure sensors using a piezoceramic material, metal strain gauge or semiconductor strain gauge are generally known. Among these pressure sensors, where a piezoceramic material is used, there is a difficulty when measuring a pressure in maintaining a pressurized state, since the pressure changes are measured by acceleration, and even if pressure can be measured, signal processing becomes complex. Further, pressure sensor using the metal strain gauge does not have a good sensitivity. On the other hand, a pressure sensor using the semiconductor strain gauge has a good sensitivity and a value of the pressure is output in proportion thereto. Thus, signal processing can be easily carried out. However, the semiconductor type pressure sensors which commercially available are used for measuring only low pressures, and a semiconductor type sensor for measuring high pressures of a combustion pressure of the internal combustion engine, e.g., 50 kg/cm$^2$ or more is not available on the market. In a conventional semiconductor type sensor, a semiconductor substate acts as a pressure bearing portion, and the ability thereof to withstand pressure is low.

Japanese Examined Patent Publication (Kokoku) No. 58-5372 discloses a pressure sensor wherein a strain gauge is provided on a metal diaphragm. The strain gauge disclosed in this publication is directly adhered to a diaphragm by vapor deposition and bonding, and thus the strain gauge would appear to be a metal strain gauge; since a semiconductor strain gauge cannot be bonded to metal by the above mentioned process.

Japanese Unexamined Patent Publication (Kokai) No. 57-48629 discloses a pressure sensor using piezoceramic material. In the pressure sensor disclosed in the above mentioned publications Nos. 58-5372 and 57-48629, a high sensitivity linear output cannot be obtained at a high pressure.

SUMMARY OF THE INVENTION

The object of the present invention is to provide a high pressure sensor for instance internal combustion engines in which a high pressure can be detected by a semiconductor stain gauge.

According to the present invention there is provided a pressure sensor comprising a metal diaphragm provided at the end of a pressure introduction portion; a glass layer bonded to the metal diaphragm surface at a point opposite to the pressure introduction side of the metal diaphragm; and a semiconductor element acting as a semiconductor strain gauge bonded to the surface of the glass layer.

Further, according to the present invention, there is provided a pressure sensor comprising:

a metal diaphragm provided at the end of the pressure introduction portion;

a glass layer bonded to the metal diaphragm surface at a point opposite to the pressure introduction side of the metal diaphragm, the thermal expansion coefficients of the metal diaphragm and the glass layer ranging from about $3.6\times10^{-6°}$ C.$^{-1}$ to $5.3\times10^{-6°}$ C.$^{-1}$ and the surface roughness of the surface of the glass layer being smaller than 0.03 μm in center line mean roughness (Ra); and a semiconductor element acting as a semiconductor strain gauge bonded to the surface of the glass layer.

BRIEF DESCRIPTION OF THE DRAWINGS

Other objects features and advantages of the invention will be understood from the following detailed description, taken in conjunction with the accompanying drawings, in which.

DESCRIPTION OF THE PREFERRED EMBODIMENTS

Figure 1A:
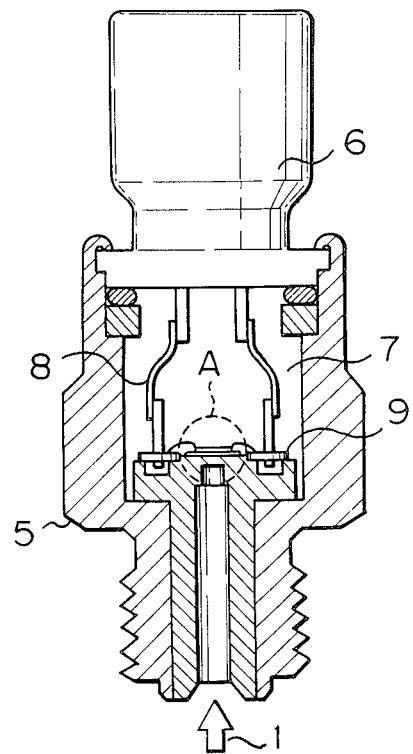
FIG. 1A is a cross-sectional view of a pressure sensor constructed in accordance with the present invention.
Figure 1B:
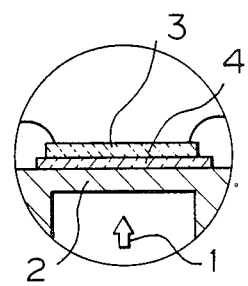
FIG. 1B is an enlarged cross-sectional view of the portion A of FIG. 1A.

FIG. 1A shows a cross-sectional view of a pressure sensor constructed in accordance with the present invention and FIG. 1B shows an enlarged cross-sectional view of the portion A of FIG. 1A.

As shown in FIG. 1B, a portion which directly receives pressure 1 is formed by a metal diaphragm 2 which is provided at the end of a pressure introduction portion. A silicon chip 3, which acts as a semiconductor strain gauge, is provided on the metal diaphragm 2 through a glass layer 4 arranged on the side of the metal diaphragm 2 opposite to the pressure introduction side thereof. This construction is assembled in the chamber 7 formed by a housing 5 and a connector 6, as shown in FIG. 1A. Reference numerals 8 and 9 show a lead wire and a ceramic substrate respectively.

The reason for the particular formation of the above embodiment is explained hereafter.

Advantageously, the portion which directly receives pressure is a durable metal diaphragm. A silicon chip is bonded to the metal diaphragm by a well known soldering process to make a pressure sensor. The relationship between the sensitivities the pressure sensor and the temperatures, i.e., the temperature property of the pressure sensor, were then determined. The results are shown in FIG. 2.

The sensitivities of the pressure sensor are shown as units of an output mV by unit pressure per unit are, i.e., mV/kg/cm$^2$. The relationship between the pressure and output are linear.

Figure 2:
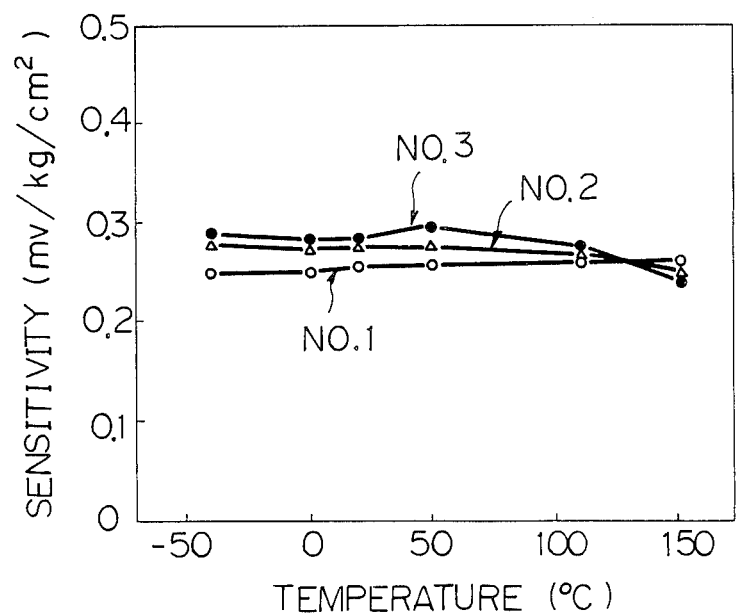
FIG. 2 is a graph of a relationship between temperature and sensitivity according to the present invention.

As shown in FIG. 2, the relationships between the sensitivity of the pressure sensor and the temperature were various and irregular.

The inventors determined that these irregularities in the above relationships stemmed from thermal stress generated during the cooling period after the soldering operation, due to the difference in the thermal coefficients of expansion of the solder and the silicon.

No solder has a thermal expansion coefficient close to that of silicon. Therefore, to solve the problem of thermal stress the present inventors used glass which has a thermal expansion coefficient that can be freely selected from a considerably wide range, as an intervening medium between the metal diaphragm and the silicon chip.

Figure 3:
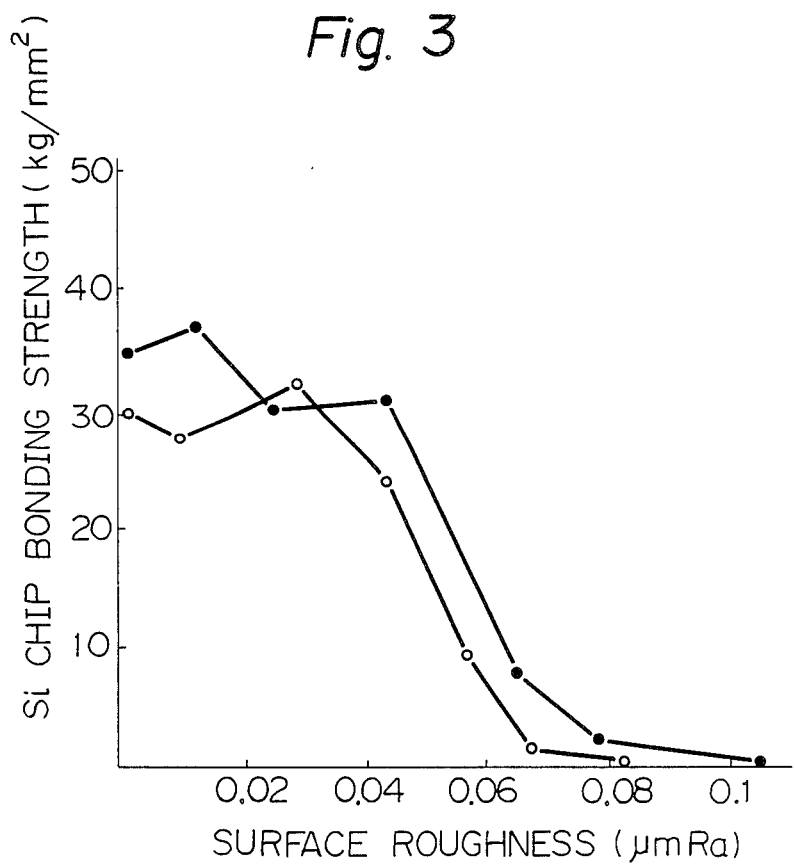
FIG. 3 is a graph of a relationship between a surface roughness of a glass layer and silicon chip bonding strength in the anode bonding process.

The results of tests of the bonding states of metal and glass and glass and a silicon chip are shown in Table 1 and FIG. 3.

As understood from Table 1 the bonding between a metal plate having thermal expansion coefficients of $4.4 \times 10^{-6}$ and $5.1 \times 10^{-6}$ and in a glass layer having thermal coefficients of $2.4 \times 10^{-6}$, $3.6 \times 10^{-6}$, and $5.3 \times 10^{-6}$, was good. Accordingly, it was assumed that the thermal expansion coefficients at the metal diaphragm and the glass layer preferably range from about $2.0 \times 10^{-6} °C.^{-1}$ to $6.0 \times 10^{-6} °C.^{-1}$.

TABLE 1

| Metal Plate Material | Metal Plate Thermal Expansion Coefficient 30~300/°C. | Glass Layer Thermal Expansion Coefficient 30~300/°C. | Bonding State |
|---|---|---|---|
| Ni—Cr—Fe Series | $4.4 \times 10^{-6}$ | $2.4 \times 10^{-6}$ | o |
|  | " | 3.6 | o |
|  | " | 5.3 | o |
|  | " | 6.4 | x |
|  | " | 9.1 | x |
| Ni—Co—Fe Series | $5.1 \times 10^{-6}$ | 2.4 | o |
|  | " | 3.6 | o |
|  | " | 5.3 | o |
|  | " | 6.4 | x |
|  | " | 9.1 | x |
| Ni—Fe Series | $6.6 \times 10^{-6}$ | 2.4 | x |
|  | " | 3.6 | x |
|  | " | 5.3 | x |
|  | " | 6.4 | x |
|  | " | 9.1 | x |
| Fe—Ni—Cr Series | $8.2 \times 10^{-6}$ | 2.4 | x |
|  | " | 3.6 | x |
|  | " | 5.3 | x |
|  | " | 6.4 | x |
|  | " | 9.1 | x |

Then, as shown in FIG. 3, to maintain this improved bonding strength, a surface roughness of a glass layer smaller than 0.05 μm in center line mean roughness (Ra), particularly 0.03 μm (Ra), is necessary. Ra means arithmetical mean deviation from the mean line. Namely, the value of Ra is an arithmetic mean of deviations from the center line to the cross-sectional curve per the standard length. A low melting point glass process and an anodic bonding process were used for bonding the silicon chip.

The low melting point glass process comprises screen-printing a glass powder paste onto a metal plate to form a glass layer thereon, calcinating it at a little lower temperature than in a usual calcination, placing silicon chip thereon, and calcinating the obtained product to bond the silicon chip to the glass layer.

Figure 4:
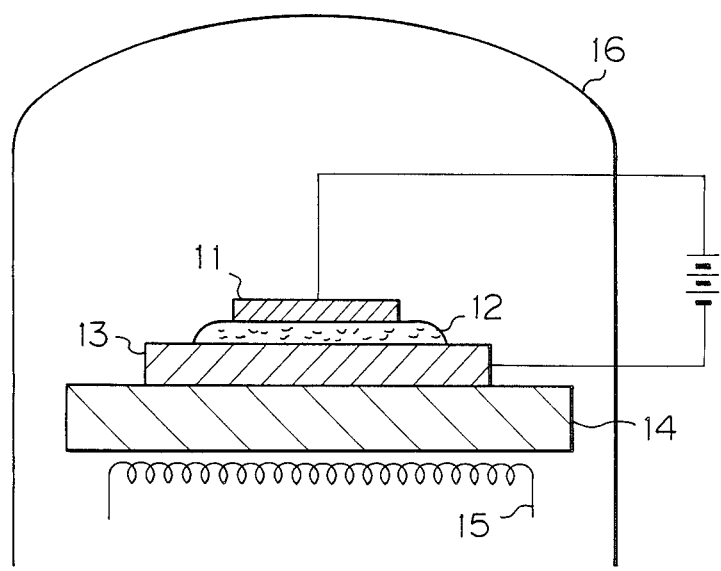
FIG. 4 is a cross-sectional view explaining the anode bonding process according to the present invention.

The anodic bonding process comprises, as shown in FIG. 4, the steps of screen-printing a glass layer 12 onto a metal plate 13, calcinating the layers 12, 13, placing a silicon chip 11 thereon, and heating the resultant product at a temperature of about 300° C. which applying a plus (+) voltage to the silicon chip side and a minus (−) voltage to the metal plate side, so that the silicon chip 11 is bonded to the glass 12. In FIG. 4 reference numerals 14, 15, and 16 denote a holder, a heater, and a chamber, respectively. As apparent from Table 1, in the bonding of the metal plate and the glass layer, and the glass layer and the silicon chip, a considerable effect is shown by the respective thermal expansion coefficients of the metal plate and the glass layer. Namely, if the respective thermal expansion coefficients of the metal plate and the glass layer are not in the range of from $2.0 \times 10^{-6}$ to $6.0 \times 10^{-6}/°C.$, the silicon chip or the glass layer will break.

Thus, when the thermal expansion coefficients of the metal plate and the glass are in the range of from $2.0 \times 10^{-6}$ to $6.0 \times 10^{-6}/°C.$ and the surface roughness of the glass layer is below 0.05 μmRa, the silicon chip and the metal plate can be satisfactorily bonded each other. However, when not in the range they cannot be bonded each other.

Figure 5:
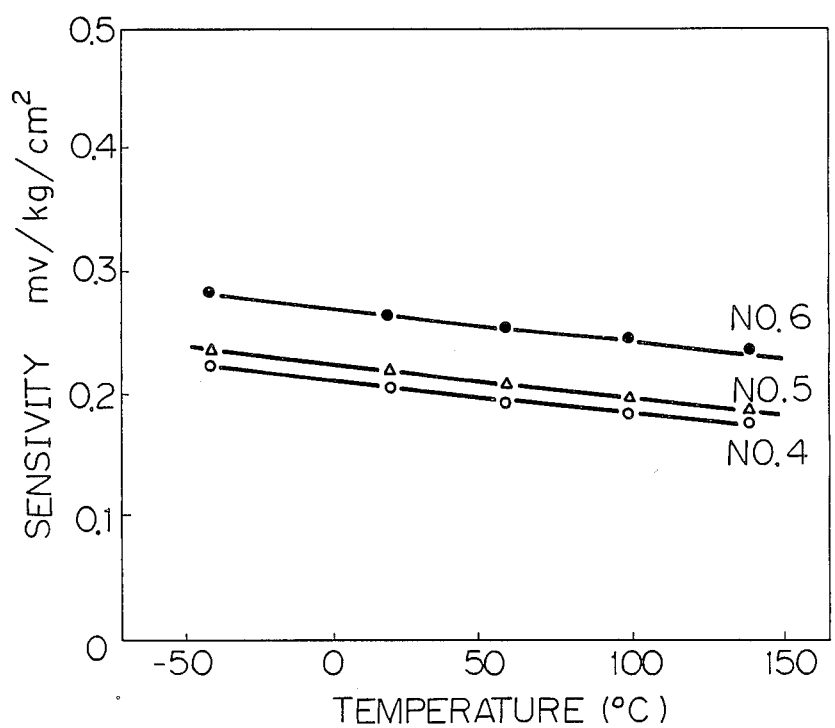
FIG. 5 is a view illustrating properties of a pressure sensor according to the present invention.

FIG. 5 is a graph illustrating the properties of a pressure sensor according to the present invention.

As shown in FIG. 5 the samples 4, 5 and 6 have the same property, in that as the temperature is increased, the sensitivities of the pressure sensors are lowered. Thus, the pressure sensor of the present invention has a constant temperature property and control of the sensor can be correctly carried out.

We claim:

1. A pressure sensor comprising:
   a metal tube having one end portion open and the other end portion closed by a metal diaphragm having a thermal expansion coefficient ranging from about $2.0 \times 10^{-6} °C.^{-1}$ to about $6.0 \times 10^{-6} °C.^{-1}$, a pressure to be inspected being introduced into said open end portion of said metal tube and applied to said metal diaphragm;
   a glass layer bonded to a surface of said metal diaphragm opposite to the pressure application side of the metal diaphragm, the thermal expansion coefficient of said glass layer ranging from about $2.0 \times 10^{-6} °C.^{-1}$ to about $6.0 \times 10^{-6} °C.^{-1}$; and
   a semiconductor chip acting as a semiconductor strain gauge bonded to the surface of said glass layer opposite said diaphragm.

2. A pressure sensor according to claim 1, wherein a surface roughness of the surface of said glass layer is smaller than 0.05 μm in center line means roughness (Ra).

3. A pressure sensor comprising:
   a metal tube having one end portion open and the other end portion closed by a metal diaphragm, a pressure to be inspected being introduced into said open end portion of said metal tube and applied to said metal diaphragm;
   a glass layer bonded to the surface of said metal diaphragm opposite to the pressure application side of said metal diaphragm, the thermal expansion coefficient of said metal diaphragm and said glass layer ranging from about $3.6 \times 10^{-6} °C.^{-1}$ to about $5.3 \times 10^{-6} °C.^{-1}$ and the surface roughness of the exposed surface of said glass layer being smaller than 0.03 μm in center line mean roughness (Ra); and
   a semiconductor chip acting as a semiconductor strain gauge bonded to the surface of said glass layer opposite said diaphragm.

* * * * *